United States Patent
Konishi et al.

(10) Patent No.: US 7,366,135 B2
(45) Date of Patent: Apr. 29, 2008

(54) RADIO CHANNEL ASSIGNMENT METHOD AND RECORDING MEDIUM OF PROGRAM FOR CONTROLLING RADIO NODE

(75) Inventors: Satoshi Konishi, Saitama (JP); Shinobu Nanba, Saitama (JP); Yoji Kishi, Saitama (JP); Shinichi Nomoto, Saitama (JP)

(73) Assignee: KDDI R & D Laboratories Inc., Kamifukuoka-shi (JP)

( * ) Notice: Subject to any disclaimer, the term of this patent is extended or adjusted under 35 U.S.C. 154(b) by 842 days.

(21) Appl. No.: 10/378,940

(22) Filed: Mar. 5, 2003

(65) Prior Publication Data

US 2003/0176193 A1    Sep. 18, 2003

(30) Foreign Application Priority Data

Mar. 14, 2002   (JP)   ............................ 2002-070259

(51) Int. Cl.
*H04Q 7/00*   (2006.01)
(52) U.S. Cl. ............... 370/329; 370/348; 370/330; 370/443; 370/459; 455/446; 455/447; 455/450
(58) Field of Classification Search ........... 370/348, 370/443, 459, 329, 330; 455/446, 447, 450
See application file for complete search history.

(56) References Cited

U.S. PATENT DOCUMENTS 6,363,062 B1 *   3/2002   Aaronson et al. ........... 370/348

FOREIGN PATENT DOCUMENTS

| JP | 05-259956 A | 10/1993 |
|----|-------------|---------|
| JP | 7-212820 | 8/1995 |
| JP | 10-285644 | 10/1998 |
| JP | 11-18142 | 1/1999 |
| JP | 2002-345016 | 11/2002 |
| WO | WO 00/76088 A1 | 12/2000 |

OTHER PUBLICATIONS

Takashi Kawabata et al., "Performance of Dynamic Slot Assignment for Fixed Wireless Access System," *IEICE Technical Report*, vol. 100 No. 195, (The Institute of Electronics, Information and Communication Engineers, Jul. 12, 2000); p. 43. (See p. 2 in the spec.).

* cited by examiner

*Primary Examiner*—Joseph Feild
*Assistant Examiner*—Pierre-Louis Desir
(74) *Attorney, Agent, or Firm*—Westerman, Hattori, Daniels & Adrian, LLP.

(57) ABSTRACT

The present invention provides a radio channel assignment method where each node in a network assigns radio channels to respective radio links in a decentralized manner without inconsistency.

The radio channel assignment method includes a step of assigning one of a pair of nodes terminating each radio link and the other thereof to an upper side and a lower side (Step S1), and a step that each radio node located to the upper side from at least one of radio links terminating at an own node assigns a frequency slot different from that of an adjacent link to a radio link locating an own node to the upper side (Step S5).

12 Claims, 6 Drawing Sheets

RADIO CHANNEL ASSIGNMENT METHOD AND RECORDING MEDIUM OF PROGRAM FOR CONTROLLING RADIO NODE

BACKGROUND OF THE INVENTION

1. Field of the Invention

The present invention relates to a radio channel assignment method in a mesh-like network and a recording medium of a program for controlling a radio node, and in particular to a radio channel assignment method constituted such that radio channels are assigned to respective radio links without inconsistency regardless of a topology of a network, and a recording medium of a program for controlling radio nodes.

2. Description of the Related Art

In a radio communication system having a radio network with mesh topology, a network configuration of Point-to-Point (P-P) type and Point-to-Multipoint (P-MP) type is mainly adopted.

Since a system of the P-P type is mainly used as a backbone network, it can be assumed that traffic volumes transmitted from two opposite radio stations are generally equal to each other. An FDD (Frequency Division Duplex) system which assigns different frequency bands to an incoming line and an outgoing line separately is adopted for such an assumption and easiness of frequency assignment.

In a system of the P-MP type, considering such an asymmetry that a traffic volume from a base station (BS) to a Customer Premise Equipment (CPE) is more than that in the opposite direction, a TDD (Time Division Duplex) system is adopted in which a channel assignment is made dynamically in response to the traffic volume from the BS to the CPE (for example, refer to "Performance of Dynamic Slot Assignment for Fixed Wireless Access System" by KAWABATA et. al.; IEICE Technical Report, RCS2000-78). Here, "a centralized control type dynamic channel assignment system" is adopted in which a BS controls and manages its own station and its CPEs, and the BS dynamically assigns channels to respective lines is adopted.

On the other hand, in a radio communication system of a mesh-like MP-MP type where P-P type systems are organically connected to one another, it is impractical, in view of increase in load to each radio stations, dependency to a traffic volume which instantaneously varies, scalability of network or the like, that one special station grasps traffic information to all radio stations existing in the mesh network to dynamically assign resource to them and distribute the result of the assignment to all the radio stations accurately. Therefore, "a decentralized dynamic channel assignment system" is effective in which a specific radio station does not conduct a centralized control on the other radio stations but each radio station assigns a channel to a link of its own node while acquiring information about neighbor radio stations.

Many decentralized dynamic channel assignment systems each being mainly directed to a cellular system have been proposed until now (for example, refer to JP07-212820A, JP10-285644A and JP11-18142).

However, in each of the above-described decentralized dynamic assignment systems, each BS manages assignment of radio resource such as a frequency slot or the like and evaluates channel qualities of the BS and mobile terminals existing in a coverage within the BS, and all the BSs existing in the system assign channels autonomously. For this reason, assuming that the mobile terminals are regarded as CPEs, such a system is similar to one of the P-MP type. On the other hand, when attention is paid to the BSs, the system appears to operate in a decentralized manner. However, since each BS manages terminals existing in its own coverage, the entire system is a dynamic channel assignment system of a hybrid type including the decentralized control type and the centralized control type or it is one of a semi-decentralized type, but it should not be called as one of the MP-MP type.

Further, in the above-described dynamic channel assignment system of the decentralized type, loads can be prevented from being centralized to a specific control station as compared with the dynamic channel assignment system of the centralized control type. Accordingly, a dependency to the traffic volume which varies instantaneously is improved, and even if a network is large-sized, the dynamic channel assignment system of the decentralized type can easily be applied thereto. However, in the radio communication system adopting the TDD system and utilizing a plurality of frequency slots, there are the following technical problems.

(1) In a mesh network, one node may possess a plurality of links, and a plurality of antennas and radio stations are provided for each node. When the same frequency slot is reused in the plurality of links and each link have different TDD Boundaries (transmission/reception timings), an interference through an adjacent antenna(s) in the same node can occur. Therefore, in the adjacent link, using the same frequency slot, it is necessary to make the TDD boundary common. For this reason, for each link, it is impossible to set an optimal TDD boundary according to the traffic volume of the link.

(2) When a frequency slot ID to be assigned to a link is updated, a pair of radio stations sharing the link must have a common recognition about the TDD Boundary or the frequency slot ID. Otherwise, since each node assigns different frequency slots to the same link, inconsistency occurs, which makes communication impossible.

Thus, even when the dynamic channel assignment system of the decentralized type is adopted, each node must set a combination of a frequency slot and a time slot to be assigned to its own link, that is, a radio channel considering a radio channel which has been assigned to another link. In the conventional art, however, there is not such recognition, so that it has been impossible to assign a radio channel to each link without inconsistency.

In order to solve such a technical problem, the present inventors have invented a radio channel assignment method and system in a mesh-like radio network constituted such that a radio channel is assigned to each radio link without inconsistency and in a mesh network constituting a radio mesh network where a number of radio nodes are arranged in a decentralized or distributed manner such that all closed loops constituted by a plurality of radio nodes form even polygons including each radio node as an apex thereby satisfying this condition, and a patent application for this invention (Japanese Patent Application No. 2000-149535) has been filed.

In the above-described conventional art, when a network includes an odd polygonal closed loop, there has been a problem that a topology must be modified in advance such that all closed loops are made even polygonal.

SUMMARY OF THE INVENTION

An object of the present invention is to provide a radio channel assignment method where, even if a network includes an odd polygonal closed loop, each node can be assigned to each radio link without inconsistency in a decentralized manner and a recording medium of a program for controlling a radio node.

According to one aspect of the present invention, there is provided a radio channel assignment method in a mesh-like network in which a plurality of radio nodes are arranged in a decentralized manner and a radio channel is assigned between opposed radio nodes to establish a radio link, comprising the following steps or features:

(1) in a mesh-like network where a plurality of radio nodes are arranged in a decentralized manner and a radio channel based upon a TDD system is assigned between a pair of opposed radio nodes in a decentralized manner to establish a radio link, the method includes a step of locating, for each radio link, respective nodes of a pair of radio nodes terminating the radio link to either one of an upper side and a lower side exclusively; and a step that, to each radio link, one of the radio nodes located to the upper side and the lower side from the radio link assigns a frequency slot, wherein the frequency slot is assigned such that coincidence in allocation attribute of TDD time slot is achieved in respective radio links, (2) one of the radio links assigns a frequency slot which has not been assigned to an adjacent link to the radio link to a radio link to be assigned with a frequency slot.

(3) one of the radio links assigns a frequency slot different from a frequency slot which has already been assigned to an adjacent link whose allocation attribute of TDD time slot is different from that of the radio link.

(4) one of the radio links includes a step of selecting an optimal frequency slot to a radio link to be assigned with a frequency slot, a step of making determination about whether or not the selected frequency slot is being used in an adjacent link, a step of, when the selected frequency slot is being used in the adjacent link, replacing the frequency slot of the adjacent link with another frequency slot, and a step of assigning the selected frequency slot to the radio link.

According to the above-described step or feature (1), for each node, not only a radio link locating its own node to an upper side but also a radio link locating its own node to a lower side are allowed to terminate simultaneously. Therefore, even when a network includes an odd polygonal closed loop having a plurality of nodes as apexes, to all radio links, one nodes of pairs of nodes terminating the radio links assigns frequency slots in a decentralized manner.

According to the above-described step or feature (2), when each node assigns a frequency slot to a radio link terminating its own node, a frequency slot which is not being used in an adjacent link to the radio link is assigned to the radio link. Therefore, even when respective nodes assign frequency slots to respective radio links in a decentralized manner, a frequency slot which has been assigned in an adjacent link is prevented from conflicting with a preceding frequency slot which has been assigned.

According to the above-described step or feature (3), even if a frequency slot is being used in an adjacent link, when a TDD time slot is made equal, assignment of the same frequency slot is allowed when the frequency slot is being used in a radio link which does not cause interference or the like. Accordingly, in case that there is not an unassigned frequency slot which is not being used in an adjacent link, frequency slot assignment can be performed.

According to the above-described step or feature (4), when a frequency slot to be newly assigned to a link to be modified (hereinafter, referred to as "a modification target link") is already being used in an adjacent link of the modification target link, the frequency slot being used is replaced with another frequency slot, and the frequency slot being used is assigned to the modification target link. Accordingly, it is made possible to perform effective assignment of a frequency slot.

DETAILED DESCRIPTION OF THE PREFERRED EMBODIMENT

Figure 1:
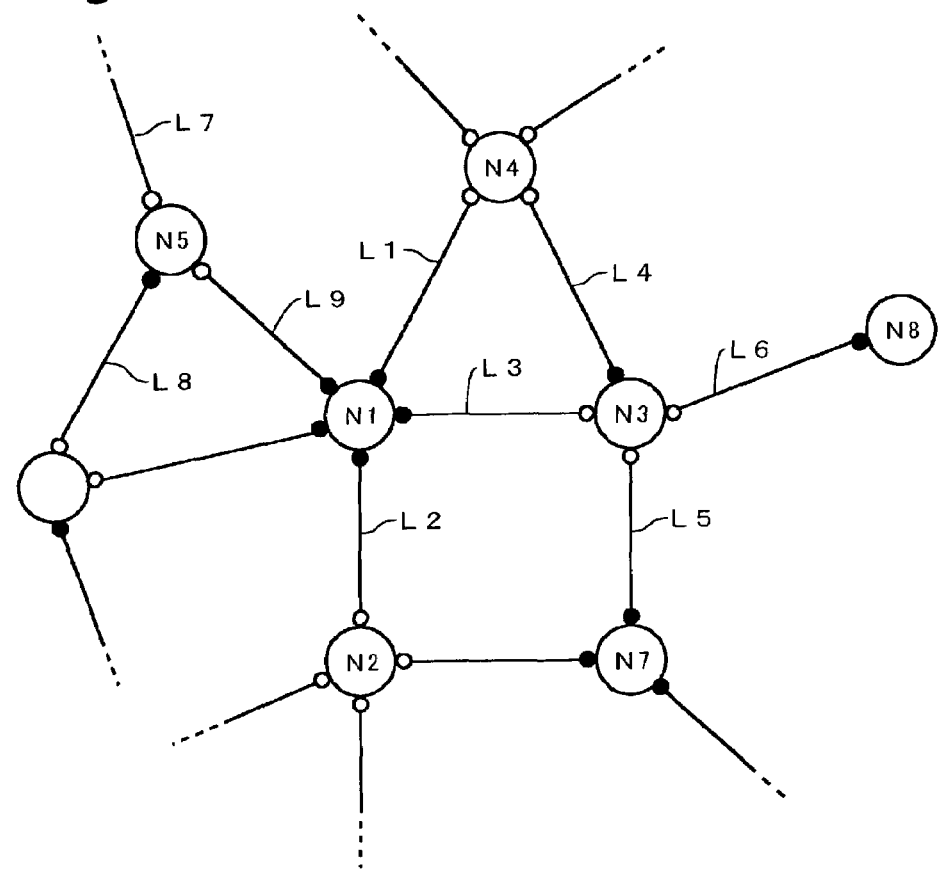
FIG. 1 is a diagram showing a configuration of a network to which the present invention is applied.

A preferred embodiment of the present invention will be explained in detail below with reference to the drawings. FIG. 1 is a diagram showing a configuration of a radio network (in this embodiment, frequency slots) based upon a TDD system are assigned in a decentralized manner according to a radio channel assignment method of the present invention. Here, a lattice-like radio mesh network where a plurality of fixed radio stations (nodes) are arranged in a decentralized manner will be explained as one example. This embodiment is applicable to not only a network where all closed loops are even polygons having a plurality of nodes as apexes but also a network including an odd polygonal closed loop(s).

In this embodiment, as shown in FIG. 1, one node of a pair of nodes at which respective radio links L1 to Ln terminate is located to a "upper side" and the other thereof is located to a "lower side". Only one node of the nodes can assign a frequency slot to the radio link regardless that the one node is located to the upper side or the lower side. For example, considering the radio link L1, when one node N1 terminating the link L1 is located to the upper side (•), the other node N4 is located to the lower side (o). Similarly, considering the radio link L2, one node N1 terminating this link is located to the upper side, and the other node N2 is located to the lower side. Locating of nodes to the upper side and the lower side may be made fixedly or it may be made in decentralized manner on the basis of negotiation between a pair of nodes terminating respective links.

Incidentally, in the embodiment, allocation attribute of a TDD time slot is defined such that a node where a small number (from start of a TDD frame to a TDD boundary) of time slot ID assigned to each radio link corresponds to a transmission period and a large number (from the TDD boundary to end of the TDD frame) of a time slot ID assigned thereto corresponds to a reception period is located to the "upper side" and a node where a large number of the same time slot ID corresponds to a transmission period and a small number thereof corresponds to a reception period is located to the "lower side".

In this embodiment, like the above-described nodes N1 and N7, nodes located at upper than all radio links terminating at own nodes are defined as "upper nodes", and nodes located lower than all radio links terminating like the nodes N2 and N4 are defined as "lower nodes".

Figure 2:
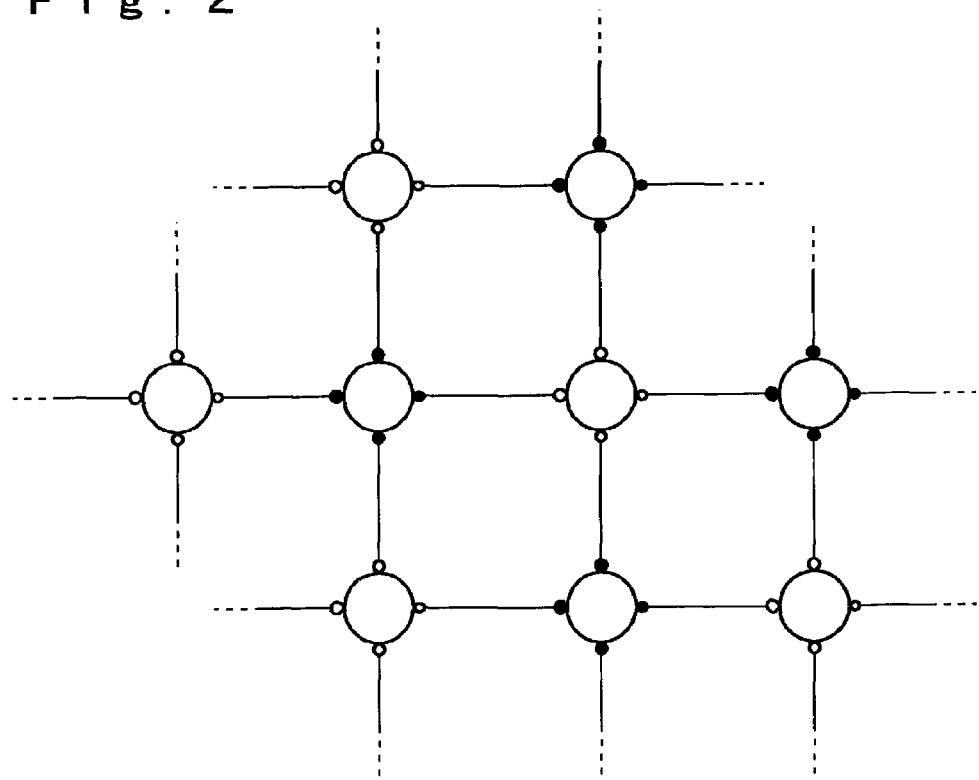
FIG. 2 is a diagram showing another network configuration.

Now, when all closed loops constituted by a plurality of radio nodes, as shown in FIG. 2, all the nodes can be each defined as either of the upper node or the lower node. On the other hand, as shown in FIG. 1, the closed loops includes an odd polygonal closed loop(s) (for example, a triangle having the nodes N1, N3 and N4 as apexes), some of nodes are obliged to be located to both the upper side and lower side.

For example, regarding the node N3 shown in FIG. 1, it is located to the upper side from the radio link L4, but it is located to the lower side from the radio links L3, L5 and L6. Similarly, regarding the node N5, it is located to the upper side from the radio link L8 but it is located to the lower side from the other radio links L7 and L9.

In this embodiment, as the nodes N3 and N5, a node located to both a upper side and a lower side according to a radio link terminating its own node is defined as "a hybrid node" distinguished from the above-described "upper node" and "lower node". Thus, in this embodiment, all nodes are classified to one of the "upper node", the "lower node" and the "hybrid node".

Figure 3:
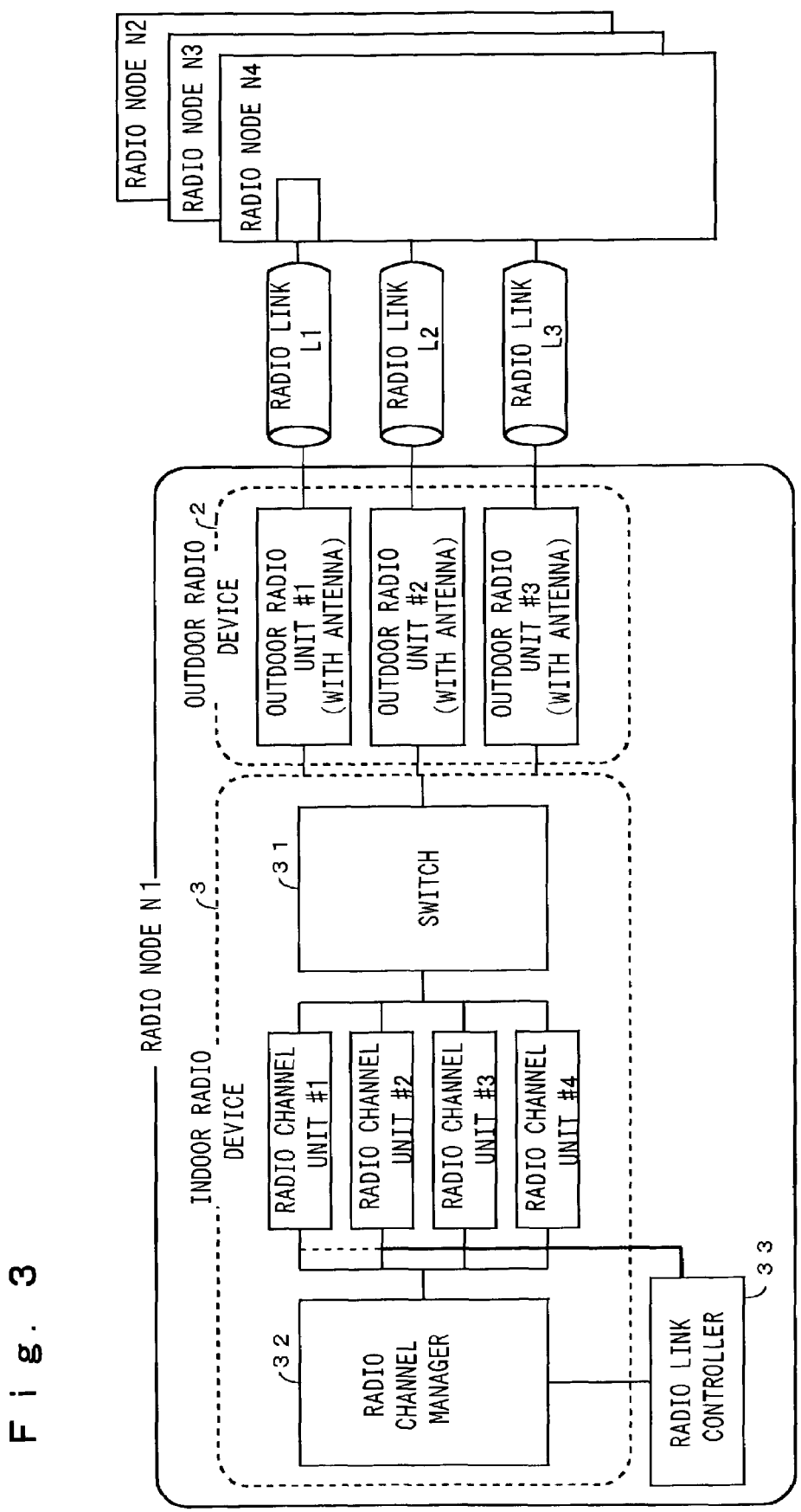
FIG. 3 is a block diagram showing a configuration of a main portion of a radio node.

FIG. 3 is a block diagram showing a configuration of a main portion of each radio node N, in which all the "upper node", the "lower node" and the "hybrid node" have the same configuration.

Each node N includes an outdoor radio device 2 and an indoor radio device 3. The outdoor radio device 2 includes a plurality of outdoor radio units #1 to #n. The indoor radio device 3 includes a plurality of radio channel units #1 to #n, a switch 31 causing each of the radio channel units #1 to #n and each of radio links L1 to Ln to correspond to each other, a radio channel manager 32 for assigning a frequency slot to each of the radio channel unit #1 to #n, and a radio link controller 33 for evaluating each radio channel.

Next, "radio channel assignment process" where one of a pair of radio nodes which are opposed to each other and terminate both ends of a radio link assigns a radio channel (a frequency slot in this embodiment) to the radio link will be explained.

Figure 4:
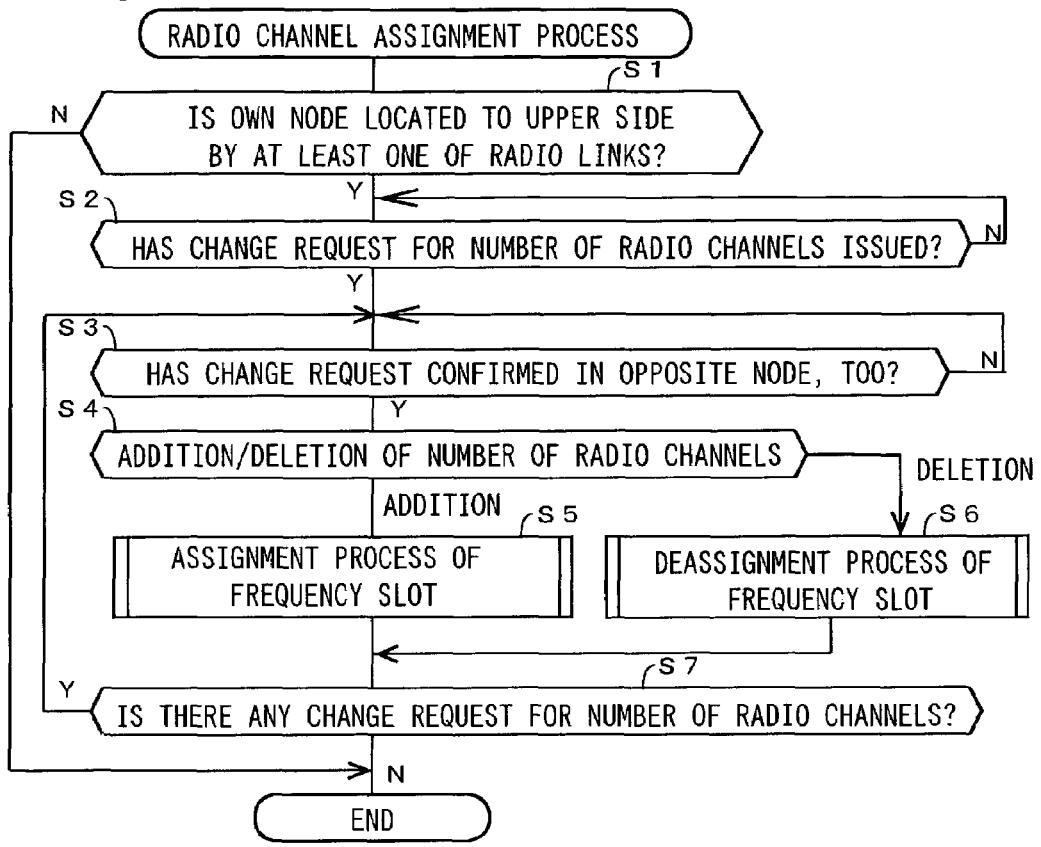
FIG. 4 is a flowchart of a radio channel assignment process.

FIG. 4 is a flowchart showing a main operation of the "radio channel assignment process" in this embodiment, in which assignment process is performed in the radio channel manager 32 of each node in a non-synchronizing manner and in a decentralized manner.

Incidentally, for easy understanding of explanation, it is assumed that only a radio node located to an upper side assigns a frequency slot for each radio link. Therefore, in this embodiment, the upper node performs "radio channel assignment process" to all radio links terminating own nodes and the hybrid node performs "radio channel assignment process" to only a radio link(s) locating its own node to the upper side.

In Step S1, it is determined whether or not a own node is located to the upper side by at least one of radio links terminating. When a radio link locating the own node to the upper side terminates, the process proceeds to Step S2, but when it does not terminate, the process is terminated. In other words, when the own node is the upper node or the hybrid node, since at least one radio link locating the own node to the upper side terminates, the process proceeds to Step S2, but when the own node is the lower node, the process is terminated.

In Step S2, regarding a radio link which terminates at the own node and locating the own node to the upper side, it is determined whether or not it is required to change the number of its channels. When the change is requested, it is determined in Step S3 whether or not this request for the change has been recognized in the opposing node, too. When the request is recognized in the opposed node, it is determined in Step S4 whether this request for the change is directed to addition or deletion of the number of radio channels.

When the request for the change is directed to the addition request, "a frequency slot assignment process" described later is performed, so that a frequency slot is newly assigned to this radio link. That is, a radio channel is added. On the contrary, when this change request is directed to the request for reducing the number of radio channels, "a frequency slot deassignment process" described later is performed in Step S6, so that the frequency slot assigned to the radio link is deassigned. That is, the number of radio channels is reduced.

In Step S7, it is determined whether or not there is still another request for addition or deletion of the number of radio channels, and when there is the another request, the process returns back to Step S3 so that the above respective steps are repeated.

Figure 5:
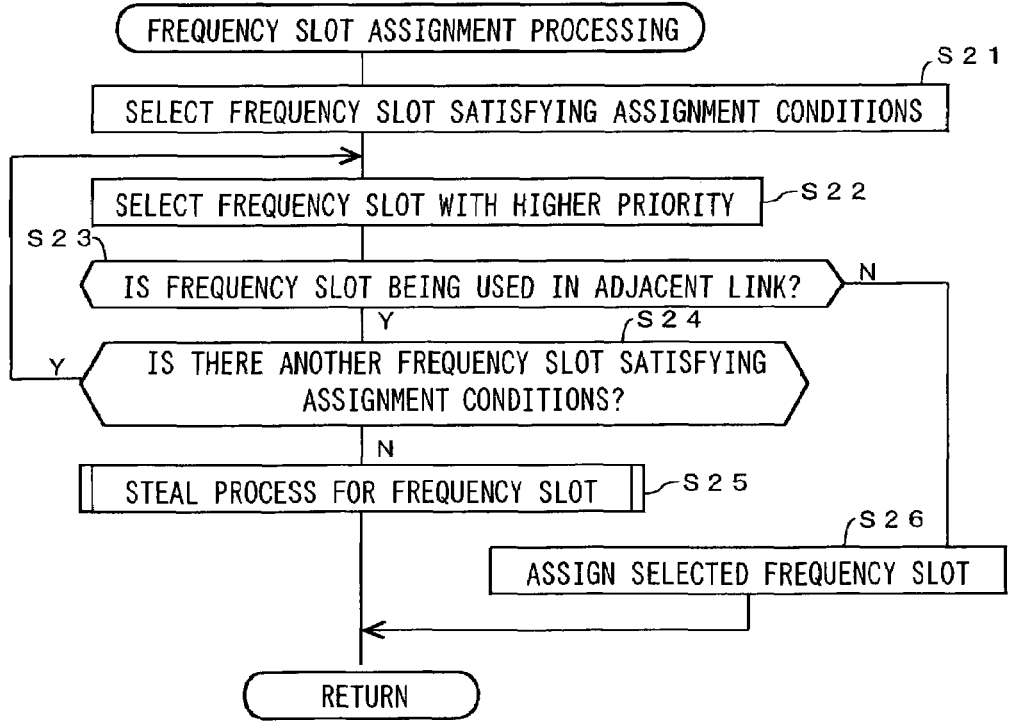
FIG. 5 is a flowchart of a frequency slot assignment process.

FIG. 5 is a flowchart showing an operation of "the frequency slot assignment process" performed in Step S5 shown in FIG. 4.

In Step S21, a plurality of frequency slots satisfying predetermined assignment conditions is selected from a plurality of frequency slots secured in advance. In the present embodiment, the following two conditions have been preliminarily set as the assignment conditions.

First Condition: Among radio links (which may hereinafter be referred to as "adjacent links) adjacent to a radio link to be modified (which may hereinafter be referred to as "a modification target link") this time, the same frequency slot as a frequency slot to be newly assigned is not used in an adjacent link which is different from the modification target link in allocation attribute of a TDD time slot.

Figure 6:
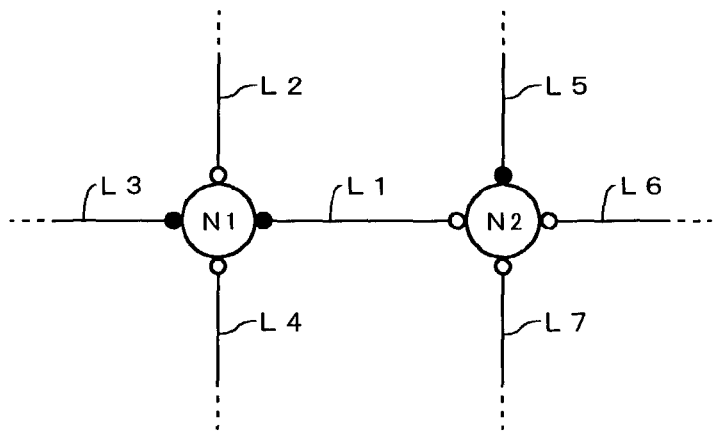
FIG. 6 is a diagram for explaining assigning conditions.

That is, as shown in FIG. 6, when a frequency slot is newly assigned to the radio link L1 established between the nodes N1 and N2, the radio links L2 to L4 terminated at one node N1 and the radio links L5 to L7 terminating at the other node N2 are defined as adjacent links of the radio link L1 in this embodiment.

In this embodiment, also, the allocation attribute of the time slot ID is defined such that the a node located to the "upper side" has a smaller number of the time slot ID as the transmission period and a node located to the "lower side" has an larger number of the time slot ID as the transmission period. Therefore, in this embodiment, the radio link L3 locating the node N1 to the upper side like the radio link L1 and the radio links L6 and L7 locating node N2 to the lower side like the radio link L1 are located to be equivalent radio links regarding the TDD time slot. In the example shown in FIG. 6, the first condition means that a frequency slot to be added to the radio link L1 has not be assigned to the radio links L3, L6 and L7.

Second Condition: A frequency slot to be newly assigned satisfies a predetermined channel quality.

In this embodiment, for example, CNIR [herein, C: carrier, N: noise, I: interference, and R: ratio, namely C/(N+I)] is adopted as the channel quality and the channel quality is represented by a ratio of a true number of CNIR obtained for each radio link and an average value of CNIR of all frequency slots, i.e., a normalized CNIR. Accordingly, the second condition means that the normalized CNIR of a frequency slot to be added to the radio link L1 is a predetermined reference value or more.

Referring to FIG. 5, again, in Step S22 a frequency slot with a high priority is selected as a frequency slot of an additional candidate on the basis of the priority set to each frequency slot separately from among a plurality of frequency slots satisfying the assignment conditions. The priority can be set on the basis of the CNIR representing the cahnnel quality, for example. Alternatively, the priority may be assigned to each frequency slot in advance, or it may be set on the basis of an evaluation value E1(f) described later.

In Step S23, determination is made about whether the above-described frequency slot of the additional candidate is being used in any adjacent link regardless of the allocation attribute of the TDD time slot. When the frequency slot of the additional candidate is unused, the frequency slot of the additional candidate is added to the modification-target link in Steps S26.

On the other hand, when the frequency slot of additional candidate has been already used in the adjacent link, determination is made in Step S24 about whether or not there is another frequency slot satisfying the assignment conditions. When there is the another frequency slot satisfying the assignment conditions, the process returns back to Step S22, where a frequency slot with the second higher priority is newly added as an additional candidate, and each of the above-described process is repeated.

On the other hand, when it is determined in the above-described Step S24 that there is not any frequency slot satisfying the assignment conditions, "steal process of a frequency slot" which takes over a frequency slot which is already being used in the adjacent link from the adjacent link as an additional candidate to conduct assignment thereof is performed in Step S25.

Figure 7:
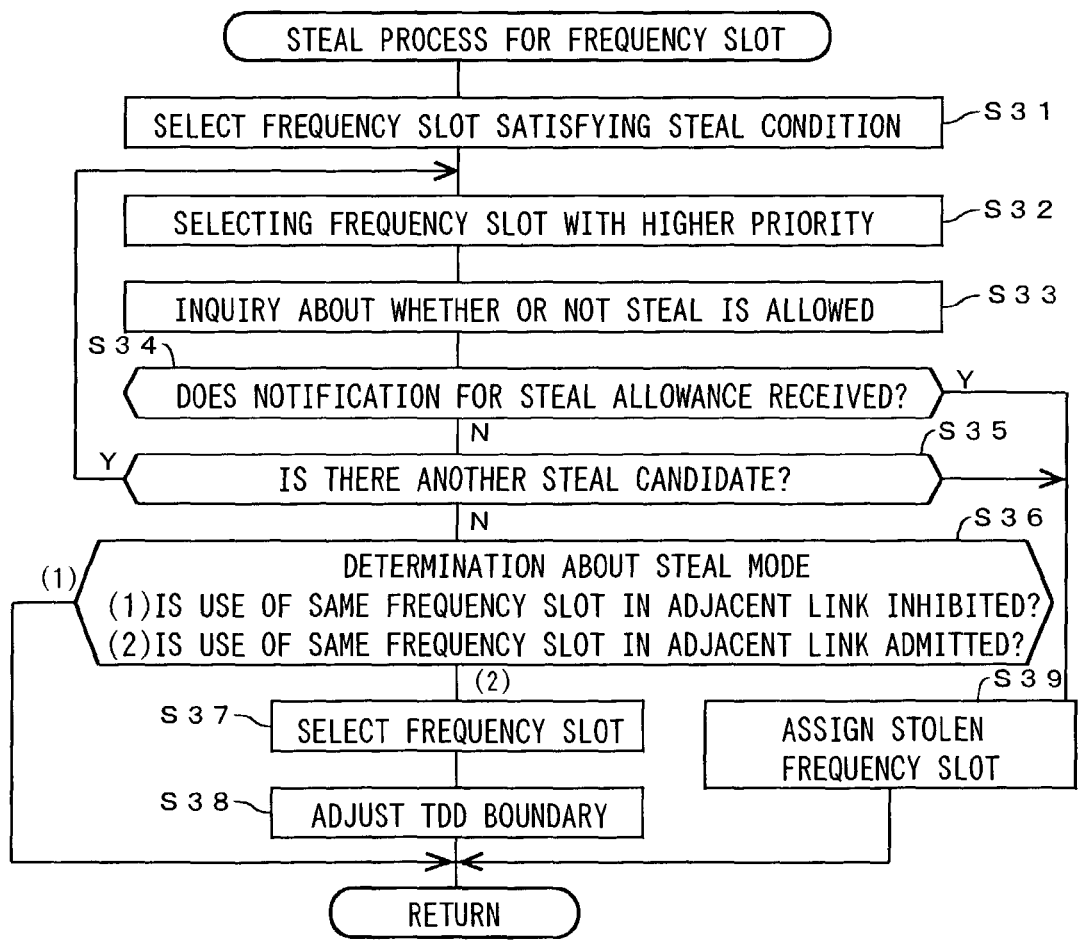
FIG. 7 is a flowchart of a steal process of a frequency slot.

FIG. 7 is a flowchart showing an operation of "the steal process of a frequency slot" performed in the above-described Step S25.

In Step S31, a frequency slot satisfying a steal condition is selected as a steal candidate. In this embodiment, the steal condition is set so as to be equal to the assignment conditions. In Step S32, a frequency slot with the highest priority is selected as the frequency slot of the steal candidate like the above.

In Step S33, inquire is made about whether or not regarding a node terminating an adjacent link which is being using the frequency slot of the steal candidate, the frequency slot of the steal candidate can be replaced with another frequency slot. The node terminating the link to which the frequency slot of the steal candidate has been assigned refers to a frequency slot which has been already assigned to an adjacent link of this link. Then, when the frequency slot which has been inquired in the above can be replaced with another frequency slot, the frequency slot of the steal candidate is replaced with the another frequency slot and a steal authorization notification is notified to a node originating the inquiry. When the replacement is impossible, a steal non-authorization notification is notified to the node originating the inquiry.

In the node originating the inquiry, when the steal authorization notification is received in Step S34, the process advances to Step S39, where the stolen frequency slot is assigned to the modification target link. On the other hand, when the steal non-authorization notification is received by the node originating the inquiry, the process advances to Step S35, but when there is another steal candidate, the process returns back to Step S32. In Step S32, a frequency slot with the second highest priority is newly selected as a steal candidate and each of the above-described process or steps are repeated.

On the other hand, when there is not another steal candidate, the process advances to Step S36, in which an operation mode of the steal process is determined. When the steal mode is a first mode which inhibits use of the same frequency slot in adjacent links, the assignment of the frequency slot is abandoned to terminate this process. When the steal mode is a second mode which allows use of the same frequency slot in adjacent links, the process advances to Step S37.

In Step S37, an optimal frequency slot is selected from a plurality of frequency slots which are the steal candidates. In Step S38, a negotiation with a node terminating a radio link to which the same frequency slot as the selected frequency slot is assigned is performed so that the TDD boundaries (transmission/reception timing) of the both are set to the same value on the basis of the traffic volume of each link.

Figure 8:
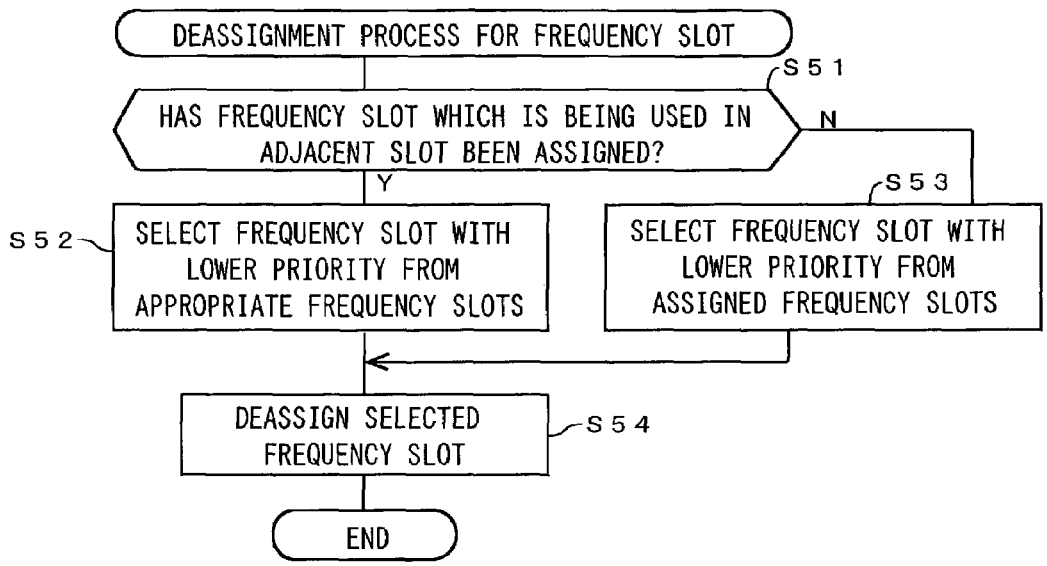
FIG. 8 is a flowchart of a frequency slot deassignment process.

FIG. 8 is a flowchart showing an operation of "the frequency slot deassignment process" performed in Step S6 shown in FIG. 4.

In Step S51, determination is made about whether or not included in the assigned frequency slots to the radio link (modification-target link) whose number of channels is to be reduced is a frequency slot which is being used in the adjacent link. When the frequency slot which is being used in the adjacent link to the present link is included, a frequency slot with the lowest evaluation value E2(f) described later is selected from the frequency slots. Incidentally, the number of frequency slots which are being used in the adjacent link is only one, the frequency slot is selected without condition. In Step S54, the selected frequency slot is deassigned.

On the other hand, in the above-described Step S51, when the radio link whose number of channels is to be reduced does not include a frequency slot which is being used in the adjacent link, a frequency slot with the lowest evaluation value E2(f) is selected from a plurality of frequency slots assigned to the deletion-target link in Step S53 and the assignment is deassigned in Step S54.

Thus, since this embodiment has allowed not only a radio link locating its own node to the upper side but also a radio link locating its own node to the lower side to terminate simultaneously to permit assignment of a frequency slot to the radio link locating the own node to the upper side, even if the network includes an odd polygonal closed loop having a plurality of nodes as apexes, frequency slots can be assigned to respective radio links in a decentralized manner.

According to the present embodiment, also, when each node assigns a frequency slot to a radio link locating the own node to the upper side, assignment of a frequency slot which is not being used in an adjacent link to this radio link is performed, so that, even if respective nodes assign frequency slots to respective radio links in a decentralized manner. A frequency slot which has been assigned in an adjacent link is prevented from conflicting with a frequency slot which has been assigned prior to the assignment of the former frequency slot.

Further, according to the present embodiment, in case that even a frequency slot which is being used in an adjacent link can be used in a radio link which does not cause an interference or the like when the TDD boundaries are set equally, assignment of the same frequency slot as this is permitted, so that, even when there is not any unassigned frequency slot which is not being used in the adjacent link, a frequency slot assignment can be made.

Furthermore, in the embodiment, when a frequency slot which is to be newly assigned to a modification-target link is being used in an adjacent link to the modification-target link, the frequency slot which is being used in the adjacent link is replaced with another frequency slot and then it is newly assigned to the modification-target link. Accordingly, an effective assignment of a frequency slot can be made possible.

Now, since a radio link changes in its link state due to a rainfall or the like, a frequency slot which has been optimal at a certain timing is not always optimal. In view of this, in this embodiment, a channel quality of each radio link is monitored periodically in a background, and a frequency slot assigned to each radio link is dynamically updated according to presence/absence of jamming or interference or the degree thereof.

Figure 9:
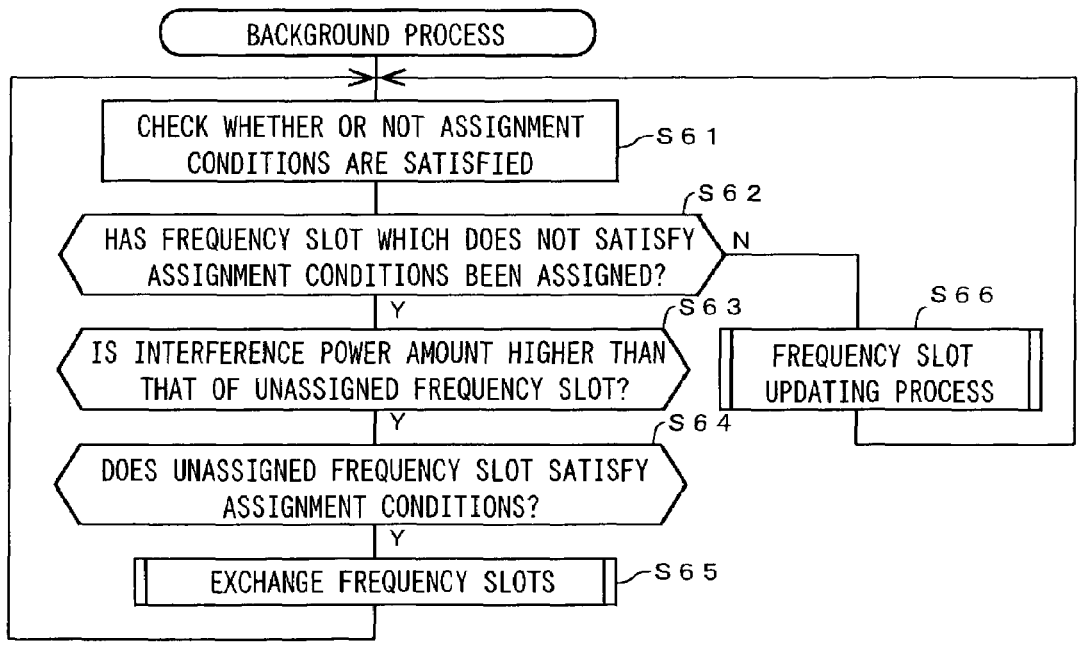
FIG. 9 is a flowchart of a background process.

FIG. 9 is a flowchart showing an operation of "a background process" performed in parallel to "the radio channel assignment process" described above.

In Step S61, determination is made about whether or not regarding all the frequency slots including an unassigned frequency slot(s), respective frequency slots satisfy the assignment conditions. In Step S62, determination is made about whether or not a frequency slot (hereinafter, referred to as "inferior slot") which does not satisfy the assignment conditions and particularly the channel quality, has been assigned to any radio link. When the inferior slot has been assigned to any radio link, determination is made in Step S63 about whether or not an interference power amount of the inferior slot is higher than an interference power amount predicted when another unassigned frequency slot is assigned to the same link for a fixed time by a fixed value or more. Incidentally, an interference power amount in each radio link of an unassigned frequency slot can be measured at a null symbol set in a TDD frame in a frequency slot during assignment.

When there is an unassigned frequency slot satisfying the condition defined in Step S63, determination is made in Step S64 about whether or not the unassigned frequency slot satisfies the assignment conditions. When the assignment conditions are satisfied, the unassigned frequency slot satisfying the assignment conditions is assigned instead of the inferior slot in Step S65. That is, a frequency slot replacement is made.

On the other hand, in the above-described Step S62, when determination is made that a frequency slot which does not satisfy the assignment conditions has not been assigned to any radio link, "a frequency slot updating process" is performed in Step S66.

Figure 10:
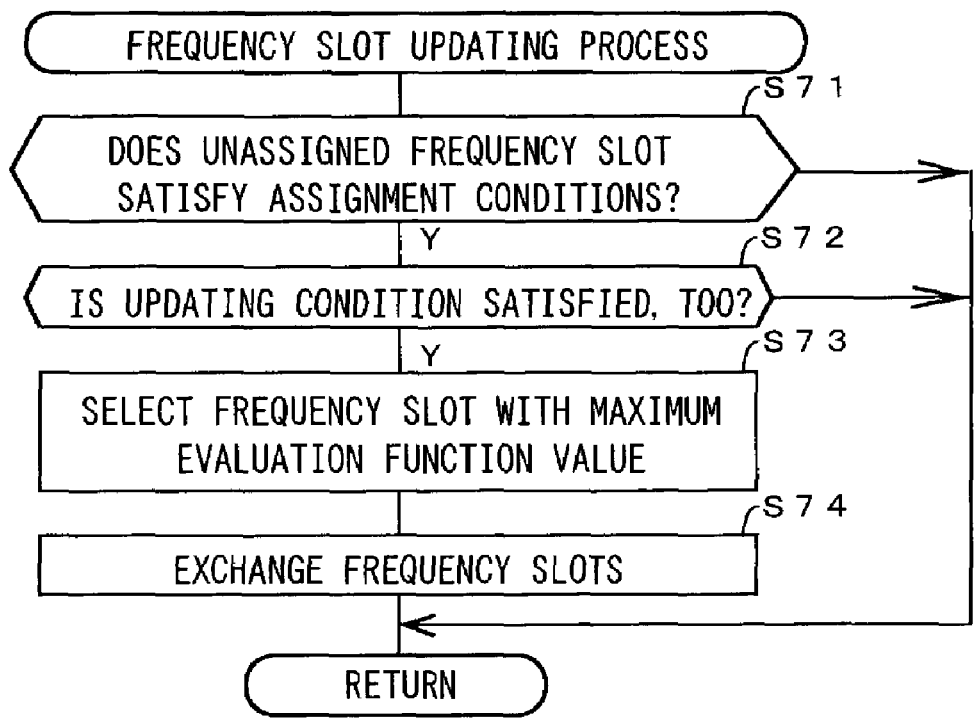
FIG. 10 is a flowchart of a frequency slot updating process.

FIG. 10 is a flowchart showing an operation of the frequency slot updating process. In Step S71, determination is made for each radio link about whether or not a frequency slot satisfying the assignment conditions is included in unassigned frequency slots. When the frequency slot is included, determination is made in Step S72 that an unassigned frequency slot satisfying the assignment conditions continuously satisfies a predetermined updating condition for a fixed time period.

In this embodiment, the evaluation value E1(f) of an unassigned frequency slot is higher than the evaluation value E1(f) of an frequency slot which has been assigned to each radio link, it is determined that the unassigned frequency slot satisfies the updating condition.

In Step S73, a frequency slot with a high evaluation value E1(f) described later is selected from unassigned frequency slots satisfying the assignment conditions. In Step S74, the selected unassigned frequency slot is assigned instead of the frequency slot which has already been assigned.

Thus, in this embodiment, since the state of each radio link is monitored periodically and a frequency slot which has been assigned to a radio link with a high frequency of jamming or interference is replaced with another frequency slot, a channel quality can always be maintained in an excellent state.

Next, an evaluation value which is attached to each frequency slot as an index for selecting a frequency slot when frequency slot addition, replacement or the like is conducted will be explained.

In this embodiment, the evaluation value E0(f) serving as an index for performing replacement of a frequency slot is given by the following equation (0), the evaluation value E1(f) serving as an index for performing addition of a frequency slot is given by the following equation (1), and the evaluation value E2(f) serving as an index for deleting a frequency slot is given by the following equation (2).

$$E0(f)=\lambda 1(R(f)-R(f'))+\lambda 2(Q(f)-Q(f'))+(D(P(f))-D(P(f')))-x-y-z \quad (0)$$

$$E1(f)=\lambda 1R(f)+\lambda 2Q(f)+D(P(f))-x-y-z \quad (1)$$

$$E2(f')=\lambda 1R(f')+\lambda 2Q(f')+D(P(f'))+x+y+z \quad (2)$$

Variables and functions used in the respective equations are as follows:

[λ1], [λ2] is a weight factor.

[f] is an unassigned frequency slot which is one of the assignment candidate.

[f'] is a currently assigned frequency slot.

[R(f)] is the assigned rate of time of frequency slot f in the past.

[Q(f)] is an index representing a channel quality, and two indexes are prepared in this embodiment.

In a first proposal, the following equation (3) is adopted as the channel quality index Q(f).

$$\text{First Proposal: } Q(f)=[\min f\{I(f)\}]-I(f) \text{ (unit: dB)} \quad (3)$$

Here, I(f) represents an interference power amount of a frequency slot f. Since there is a possibility that an interference power amount is different between both nodes terminating a link, a higher value of the interference power amounts measured at the both nodes is decided as a representative value of the interference power amount of the frequency slot f.

$$\text{Second Proposal: } Q(f)=CR\_MAX-I(f)(\text{unit: dB}) \quad (4)$$

Here, CR_MAX represents a reception power at the maximum transmission power amount. Assuming that an arbitrary transmission power amount is CT, a reception power amount at CT is CR and a maximum transmission power amount is CT_MAX, the following equation (5) is given.

$$CR\_MAX=CR+CT\_MAX+CT \quad (5)$$

[D(P(f))] is a weighting parameter (a constant value) defined for each priority P(f) of the frequency slot f.

[x] is a penalty imposed when a radio link posses the same TDD boundary as that of an adjacent link by assign a frequency slot f at a time of addition of a channel (alternatively, deleting a frequency slot f at a time of deletion of a channel) to reuse the same frequency slot as that of the adjacent link. When n adjacent links have the same TDD boundary, x=nα (α is a fixed value set separately) is obtained. When a frequency slot which is different from that in an adjacent link is assigned, the number of adjacent links having the same TDD boundary is 0, which results in x=0.

Figure 11:
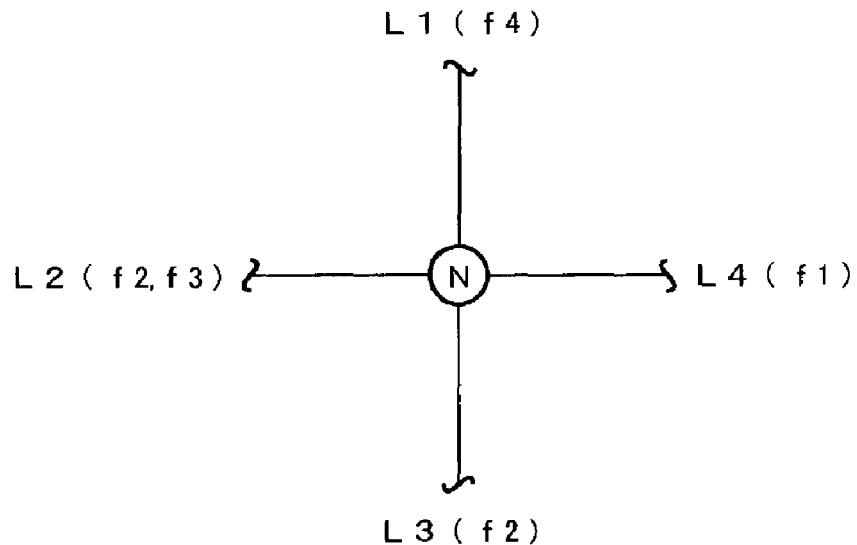
FIG. 11 is a diagram showing how to obtain penalty in an evaluation value.

FIG. 11 is a diagram for explaining how to calculate the above-described [x], in which four links L1 to L4 terminates at a node N. A frequency slot f4 has been assigned to the link L1, a frequency slot f2 has been assigned to the link L2, a frequency slot f2 has been assigned to the link L3, and a frequency slot f1 has been assigned to the link L4.

Considering a case that the frequency slot f2 is newly assigned to the link L4, the assignment results in that the link L4 utilizes the same frequency slot f2 as that of the link L2, L3. Therefore, since the two links L2 and L3 must be caused to coincide with the TDD boundary, x=2.

Further, considering a case that the frequency slot f3 is newly assigned to the link L4, as the link L2 and the TDD boundary assigned with the same frequency slot f3 must be not only caused to coincide with each other but also the frequency slot f2 which has been assigned to this link L2 has been also assigned to the link L3, the TDD boundary of the link L4 must be caused to coincide with the TDD boundary of the link L3 which has already coincided with the link L2 in TDD boundary. Therefore, x=2 is obtained. Thus, the value of "x" does not coincide with the number of the adjacent link to which a frequency slot to be newly assigned has already been assigned necessarily.

[y] is a penalty imposed when a frequency slot f is a adjacent frequency slot of a frequency slot f' (f'≠f) which has already been assigned to another channel in the link, in which, when appropriate, y=β, but when not appropriate, y=0.

[z] is a penalty imposed when a frequency slot f is affected by third-order mutual modulation product due to two or more frequency slots f' (f'≠f) which have already been assigned to the same link, in which, when appropriate, z=γ but when not appropriate, z=0.

Incidentally, the above-described embodiment has been explained assuming that a frequency slot is assigned to a node located to the upper side for each radio link, but the present invention is not limited to this embodiment, but a node located to the lower side may be assigned with a frequency slot. That is, either one of a pair of radio nodes terminating a node can be assigned with a frequency slot even if the one is located to the upper side or the lower side. Even in either case, frequency slots must be assigned such that allocation attributes of a TDD time slot coincide with each other in respective radio link.

According to the present invention the following effects can be achieved:

(1) For each node, not only a radio link locating its own node to an upper side but also a radio link locating its own node to a lower side are allowed to terminate simultaneously. Therefore, even when a network includes an odd polygonal closed loop having a plurality of nodes as apexes, to all radio links, one nodes of pairs of nodes terminating the radio links assigns frequency slots in a decentralized manner.

(2) When each node assigns a frequency slot to a radio link terminating its own node, a frequency slot which is not being used in an adjacent link to the radio link is assigned to the radio link. Therefore, even when respective nodes assign frequency slots to respective radio links in a decentralized manner, a frequency slot which has been assigned in an adjacent link is prevented from conflicting with a preceding frequency slot which has been assigned.

(3) Even if a frequency slot is being used in an adjacent link, when a TDD time slot is made equal, assignment of the same frequency slot is allowed when the frequency slot is being used in a radio link which does not cause interference or the like. Accordingly, in case that there is not an unassigned frequency slot which is not being used in an adjacent link, frequency slot assignment can be performed.

(4) When a frequency slot to be newly assigned to a link to be modified (hereinafter, referred to as "a modification target link") is already being used in an adjacent link of the modification target link, the frequency slot being used is replaced with another frequency slot, and the frequency slot being used is assigned to the modification target link. Accordingly, it is made possible to perform effective assignment of a frequency slot.

What is claimed is:

1. A radio channel assignment method in a mesh-like network in which a plurality of radio nodes are arranged in a decentralized manner and radio channels adopting TDD architecture between a pair of opposite radio nodes are assigned in a decentralized manner to establish a radio link, comprising: a step of, for each radio link, locating respective ones of a pair of radio nodes terminating the radio link to either one of an upper side and a lower side exclusively; and a step that one of a radio node located to an upper side from the radio link or a radio node located to a lower side therefrom assigns a frequency slot to each radio link except for the radio links having the same side of the respective nodes, wherein the frequency slot is assigned such that coincidence in allocation attribute of TDD time slot is achieved in respective radio links; and wherein the radio nodes comprises: a step that one of the radio nodes selects a frequency slot optimal to a radio link to be assigned with a frequency slot; a step of making determination about whether or not the selected frequency slot is being used in the adjacent link; a step of, when the selected frequency slot is being used in the adjacent link, replacing the frequency slot of the adjacent link with another frequency slot; and a step of assigning the selected frequency slot to the radio link.

2. A radio channel assignment method according to claim 1, wherein the radio nodes assigns a frequency slot which has not been assigned to an adjacent link to a radio link to be assigned with a frequency slot to the radio link to be assigned.

3. A radio channel assignment method according to claim 2, wherein the radio nodes assigns, to a radio link to be assigned with a frequency slot, a frequency slot which has not been assigned to an adjacent link different in allocation attribute of a TDD time slot from the radio link of the radio links.

4. A radio channel assignment method according to claim 1, wherein the radio nodes includes a step of deassigning the assignment of the assigned frequency slot to the radio link.

5. A radio channel assignment method according to claim 4, wherein, when a plurality of frequency slots are included in a radio link whose frequency slot is to be deassigned, the same frequency slot as the frequency slot assigned to an adjacent link is selectively deassigned from the plurality of frequency slots.

6. A radio channel assignment method according to claim 4, wherein, when a plurality of frequency slots are included in a radio link whose frequency slot is to be deassigned, a frequency slot with a low evaluation value is deassigned from the plurality of frequency slots.

7. A radio channel assignment method according to claim 1, further comprising:

a step of evaluating an assigned frequency slot to each radio link;

a step of evaluating an unassigned frequency slot; and a step of, when an evaluation of an assigned frequency slot is lower than an evaluation of an unassigned frequency slot, assigning the unassigned frequency slot instead of the assigned frequency slot.

8. A radio channel assignment method according to claim 1, wherein, at least one of the plurality of radio nodes, both a radio link locating its own node to an upper side and a radio link locating its own node to a lower side have been terminated.

9. A computer-readable recording medium recording and storing a computer program to execute a method for assigning radio channels arranged on a network in a decentralized manner and adopted TDD system between opposite radio nodes in decentralized manner to establish a radio link, comprising: a step of, for each radio link terminating at an own node, locating the own node to an upper side or a lower side exclusively from an opposite node sharing the radio link; a step of imparting a right for assigning a frequency slot to the radio link to one of the own node and the opposite node; and a step of, when the right is imparted to the own node, assigning a frequency slot to the radio link, a step that one of the radio nodes selects a frequency slot optimal to a radio link to be assigned with a frequency slot; a step of making determination about whether or not the selected frequency slot is being used in the adjacent link; a step of, when the selected frequency slot is being used in the adjacent link, replacing the frequency slot of the adjacent link with another frequency slot; and a step of assigning the selected frequency slot to the radio link, wherein a radio node controls the frequency slot to be assigned such that allocation attribute of TDD time slot in the radio link is coincident with that in another radio link.

10. The computer-readable recording medium recording and storing a computer program to execute a method according to claim 9, wherein the step of assigning a frequency slot performs assignment of a frequency slot different from a frequency slot which has already been assigned to an adjacent link to a radio link to be assigned with a frequency slot.

11. The computer-readable recording medium recording and storing a computer program to execute a method according to claim 10, wherein the step of assigning a frequency slot performs assignment of a frequency slot which has not been assigned to an adjacent link different in allocation attribute of TDD time slot from a radio node to be assigned with the frequency slot.

12. A computer-readable recording medium recording and storing a computer program to execute a method for assigning radio channels arranged on a network in a decentralized manner and adopted TDD system between opposite radio nodes in decentralized manner to establish a radio link, comprising:

a step of, for each radio link terminating at an own node, locating the own node to an upper side or a lower side exclusively from an opposite node sharing the radio link;

a step of imparting a right for assigning a frequency slot to the radio link to one of the own node and the opposite node;

a step of selecting a frequency slot optimal to a radio link to be assigned with the frequency slot;

a step of determining whether or not the selected frequency slot is being used in an adjacent link to the radio link;

a step of, when the selected frequency slot is being used in the adjacent link, replacing a frequency slot of the adjacent link with another frequency slot; and a step of, when the right is imparted to the own node, assigning a frequency slot to the radio link, wherein a radio node controls the frequency slot to be assigned such that allocation attribute of TDD time slot in the radio link is coincident with that in another radio link.

* * * * *